(12) United States Patent
Wood et al.

(10) Patent No.: US 10,260,417 B2
(45) Date of Patent: Apr. 16, 2019

(54) AIR INTAKE TURBOPROP ASSEMBLIES

(71) Applicant: General Electric Company, Schenectady, NY (US)

(72) Inventors: Trevor Howard Wood, Clifton Park, NY (US); Davide Giacché, Garching (DE); Kishore Ramakrishnan, Rexford, NY (US)

(73) Assignee: General Electric Company, Schenectady, NY (US)

(*) Notice: Subject to any disclaimer, the term of this patent is extended or adjusted under 35 U.S.C. 154(b) by 341 days.

(21) Appl. No.: 14/977,854

(22) Filed: Dec. 22, 2015

(65) Prior Publication Data

US 2017/0175627 A1    Jun. 22, 2017

(51) Int. Cl.
| | |
|---|---|
| *F02C 7/04* | (2006.01) |
| *B64C 7/02* | (2006.01) |
| *B64D 27/12* | (2006.01) |
| *B64D 27/14* | (2006.01) |

(52) U.S. Cl.
CPC ............... *F02C 7/04* (2013.01); *B64C 7/02* (2013.01); *B64D 27/12* (2013.01); *B64D 27/14* (2013.01)

(58) Field of Classification Search
CPC ........... F02C 7/04; B64D 27/14; B64D 27/12; B64C 7/02
See application file for complete search history.

(56) References Cited

U.S. PATENT DOCUMENTS

| | | | |
|---|---|---|---|
| 3,095,696 A * | 7/1963 | Rumble | F02K 1/827 60/770 |
| 3,532,305 A | 10/1970 | Madelung | |
| 3,946,830 A | 3/1976 | Kutney et al. | |
| 4,240,250 A | 12/1980 | Harris | |
| 5,058,617 A | 10/1991 | Stockman et al. | |
| 5,483,791 A | 1/1996 | Kotwal et al. | |
| 5,915,403 A | 6/1999 | McConachie et al. | |
| 5,961,067 A | 10/1999 | Hall et al. | |
| 6,431,498 B1 | 8/2002 | Watts et al. | |
| 6,764,043 B2 | 7/2004 | Sankrithi et al. | |
| 9,057,329 B2 * | 6/2015 | Weir | F02C 7/045 |
| 2013/0164488 A1 | 6/2013 | Wood et al. | |
| 2013/0209229 A1 | 8/2013 | Xu et al. | |

FOREIGN PATENT DOCUMENTS

CA    2072417 A1    3/1993

OTHER PUBLICATIONS

Matthew Morgan Cand, "A 3D High-Order Aeroacoustics Model for Turbomachinery Fan Noise Propagation", 'pp. 176, Jun. 2005.
Konstantinos Kontis, "On Physical Aeroacoustics with Some Implications for Low-Noise Aircraft Design and Airport Operations", Aerospace, 2(1), 17-90, 2015.

* cited by examiner

*Primary Examiner* — Valentina Xavier
(74) *Attorney, Agent, or Firm* — Joseph J. Christian

(57) ABSTRACT

A turboprop assembly includes a nacelle with a main nacelle body and a nacelle extension coupled to the main nacelle body. The nacelle extension has a wall that defines an air intake port. The air intake port has a non-circular, non-rectangular, and non-oval shaped perimeter extending in two of three dimensions.

11 Claims, 6 Drawing Sheets

AIR INTAKE TURBOPROP ASSEMBLIES

BACKGROUND

The field of the disclosure relates generally to turboprop assemblies and, more particularly, to a profile of an intake port for turboprop assemblies.

Most known air inlets for turboprops are positioned a distance behind propellers to receive air for a turboprop engine. Known turboprop air intake ports are shaped with a curved inlet lip that lies on a geometric plane substantially normal to the mean airflow from the propellers. When a propeller passes in front of the intake port, aerodynamic loading increases temporarily until the propeller rotates away from the intake port. Airflow around the propeller reacts with fluctuations in the surface forces on the propeller that radiates acoustically and causes an increase in noise generated by the propeller. Furthermore, the airflow on the propeller can weaken during this interaction effect, thereby increasing the flow distortion in the propeller wakes which propagate and hit the lip of the inlet, thereby creating a pressure fluctuation that radiates acoustically, causing a further increase in the noise generated. The unsteady aerodynamic interaction between the propeller and air inlet on a typical turboprop assembly leads to additional sound generation, thereby adding to sound annoyance for passengers on the aircraft and communities on the ground.

BRIEF DESCRIPTION

In one aspect, a turboprop assembly is provided. The turboprop assembly includes a nacelle with a main nacelle body and a nacelle extension coupled to the main nacelle body. The nacelle extension has a wall that defines an air intake port. The air intake port has a non-circular, non-rectangular, and non-oval shaped perimeter extending in two of three dimensions, defined as orthogonal axes.

In another aspect, a turboprop assembly is provided. The turboprop assembly includes a nacelle with a main nacelle body and a nacelle extension coupled to main nacelle body. The nacelle extension has a wall that defines an air intake port. The air intake port includes a plurality of protuberances around its perimeter.

In yet another aspect, an aircraft is provided. The aircraft includes a fuselage, a pair of wings, and at least one turboprop assembly coupled to either the wings or the fuselage. The turboprop assembly includes a nacelle with a main nacelle body and a nacelle extension coupled to the main nacelle body. The nacelle extension has a wall that defines an air intake port. The air intake port has a non-circular, non-rectangular, and non-oval shaped perimeter extending in two of three dimensions, defined as orthogonal axes.

DRAWINGS

These and other features, aspects, and advantages of the present disclosure will become better understood when the following detailed description is read with reference to the accompanying drawings in which like characters represent like parts throughout the drawings, wherein.

Figure 1:
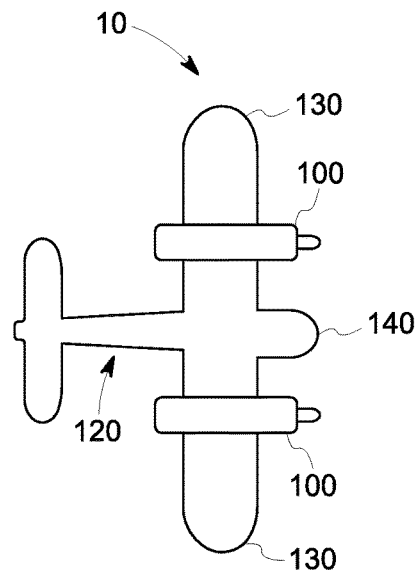
FIG. 1 is a top plan view of an exemplary aircraft showing an exemplary turboprop assembly.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The term "radially contoured" refers to an air inlet with a top lip or a bottom lip that is substantially further away from the propellers than the other lip.

The term "circumferentially contoured" refers to an inlet that, when viewed from below, is substantially convex with the sides of the inlet lip substantially further away from the propellers than the central portion of the lip.

The terms "air intake port", "intake port", "air inlet", and "inlet" are used interchangeably and are synonymous.

The air inlets shapes for turboprop assemblies as described herein overcome a number of deficiencies associated with known turboprop systems. Specifically, the unsteady aerodynamic interaction between the propeller and inlet on known turboprop assemblies leads to additional sound generation beyond the noise of the components of the turboprop assembly by themselves. While the severity of the unsteady aerodynamic interaction could be reduced by redesigning the propeller airfoil section near the hub, this may not be feasible because of system considerations such as, for example, the spacing between the propeller hub and the intake port, or the integrity of the propeller root attachment. But, by reconfiguring the shape of the inlet, the wakes in the airflow produced by the propellers are less impacted by the unsteady aerodynamic interaction that occurs as the propellers pass in front of the inlet, thus leading to lower levels of wake distortions to lessen the unsteady response of these wakes impinging on the inlet. The reconfiguration of the inlet shape reduces the aerodynamically-generated sounds and also increases the propeller efficiency, which reduces overall aircraft fuel burn. The inlet shapes described herein are configured specifically for air inlets and are reshaped to reduce the noise generated by the interaction of airflow between the propellers and the air inlet.

FIG. 1 is a top plan view of an exemplary aircraft 10 showing an exemplary turboprop assembly 100. Aircraft 10 includes a fuselage 120, a pair of wings 130 coupled to fuselage 120, and a plurality of exemplary turboprop assemblies 100 coupled to wings 130. In other embodiments, a single turboprop assembly 120 is coupled to fuselage 120 at the nose 140 of aircraft 10, or coupled to any other part of aircraft 10 that allows aircraft 10 to fly properly.

Figure 2:
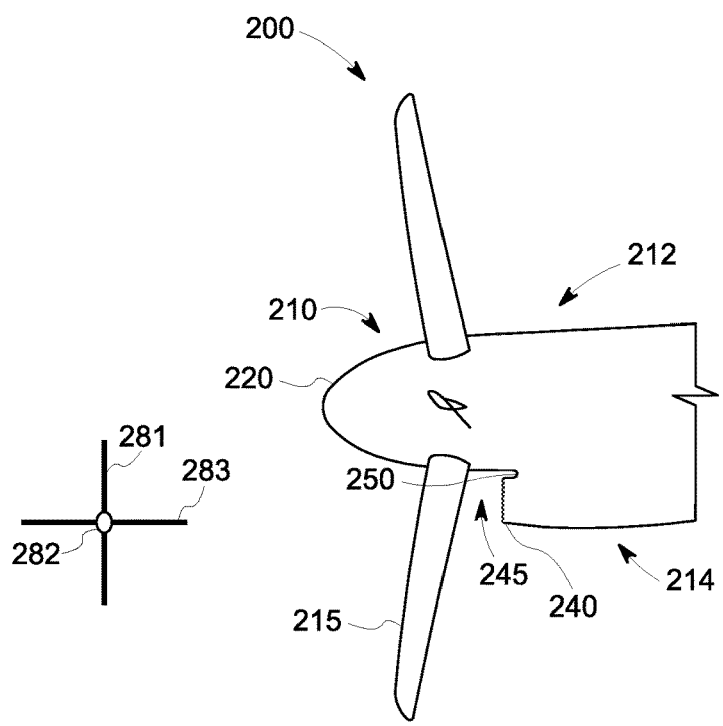
FIG. 2 is a side perspective view of a prior art turboprop assembly used with the aircraft in FIG. 1.

FIG. 2 is a side perspective view of a prior art turboprop assembly 200 used with aircraft 10 (shown in FIG. 1). Turboprop assembly 200 includes a nacelle 210 that includes main nacelle body 212 and nacelle extension 214 coupled to main nacelle body 212. Turboprop assembly 200 also includes a plurality of propellers 215 that rotate about hub 220. Plurality of propellers 215 include any suitable number of propellers that rotate about hub 220. Hub 220 is coupled to main nacelle body 212. Nacelle extension 214 includes at least one wall 240 that defines an air intake port 245 spaced a distance from propellers 215 to receive air for fuel combustion in a suitable engine (not shown) within nacelle 210. In one embodiment, flow diverter 250 extends between nacelle extension 214 and main nacelle body 212. Main nacelle body 212 defines three orthogonal axes along vertical axis 281, lateral axis 282 and streamwise axis 283. In the embodiment, main nacelle body 212 is substantially cylindrically shaped and extends from the tip of hub 220 along streamwise axis 283 towards the rear of the aircraft. Nacelle extension 214 is positioned underneath nacelle 210 and is substantially rectangular shaped, extending along streamwise axis 283 from air intake port 245 towards the rear of the plane. In one embodiment, nacelle extension 214 is unitarily formed with nacelle 210. In another embodiment, nacelle extension 214 is coupled to nacelle 210. In other embodiments described herein, air intake port 245 has a perimeter that is non-circular, non-rectangular, and non-oval shaped that extends along at least two of three orthogonal axes, defined herein as vertical axis 281, lateral axis 282, and streamwise axis 283.

Figure 3:
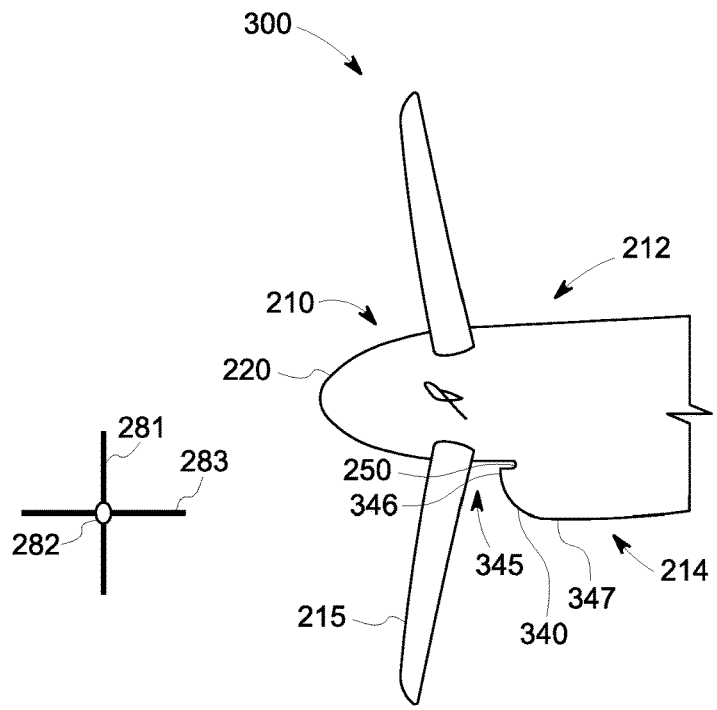
FIG. 3 is a side perspective view of an exemplary turboprop assembly used with the aircraft in FIG. 1 showing one embodiment of a radially contoured inlet.

FIG. 3 is a side perspective view of an exemplary turboprop assembly 300 used with aircraft 10 (shown in FIG. 1) showing one embodiment of a radially contoured inlet. In the exemplary embodiment, turboprop assembly 300 includes at least one wall 340 defining air intake port 345. Air intake port 345 extends along both vertical axis 281 and streamwise axis 283. As shown in FIG. 3, as intake port 345 extends downward in vertical axis direction 281, intake port 345 extends rightward in the axial direction 283 from its upper edge 346, i.e., the edge closest to flow diverter 250, to its lower edge 347, i.e., the edge furthest away from flow diverter 250, such that lower edge 347 of intake port 345 is recessed further away from propellers 215 than upper edge 346 of intake port 345. In the illustrated embodiment, intake port 345 is curved or arcuate in shape when viewed from the side as in FIG. 3. In an alternative embodiment, intake port 345 is linearly shaped, i.e., not curved, when viewed from the side.

Figure 4:
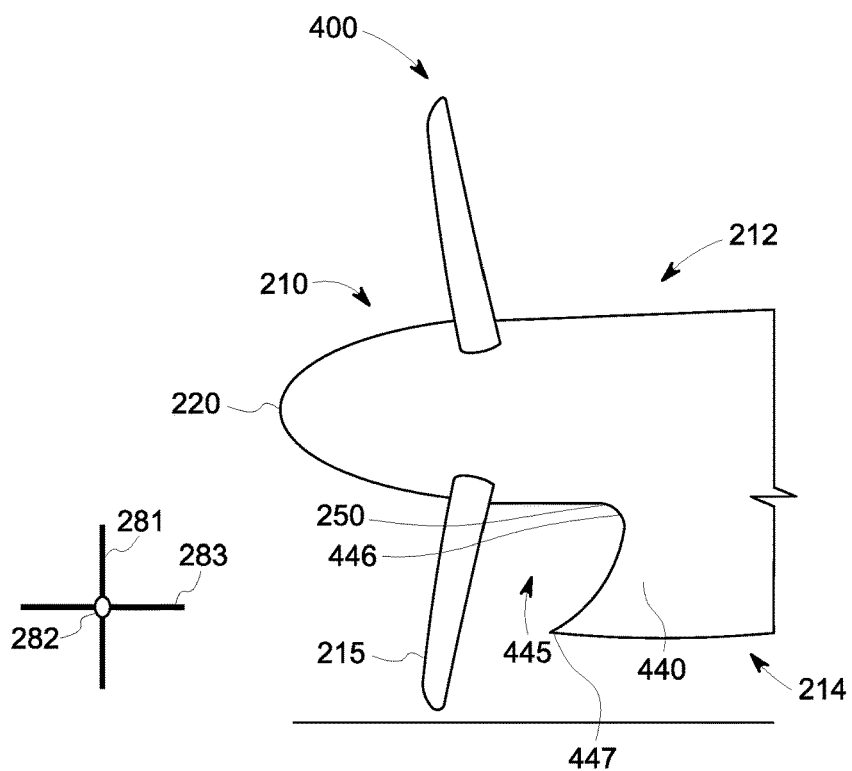
FIG. 4 is a side perspective view of an exemplary turboprop assembly used with the aircraft in FIG. 1 showing another embodiment of a radially contoured inlet.

FIG. 4 is a side perspective view of an exemplary turboprop assembly 400 used with aircraft 10 (shown in FIG. 1) showing another embodiment of a radially contoured inlet. The turboprop assembly 400 is similar to the turboprop 300 shown in FIG. 3. Turboprop assembly 400 includes at least one wall 440 defining air intake port 445. Intake port 445 extends along both vertical axis 281 and streamwise axis 283. However, as intake port 445 extends upward in the vertical axis direction, intake port 445 extends rightward in the axial direction from its lower edge 447, i.e., the edge furthest away from flow diverter 250, to its upper edge 446, i.e., the edge closest to flow diverter 250, such that upper edge 446 of intake port 445 is recessed further away from propellers 215 than the lower edge 447 of intake port 445. In this embodiment, inlet lip 445 is curved or arcuate in shape when viewed from the side as in FIG. 4. In another embodiment, intake port 445 is linearly shaped, i.e., not curved, when viewed from the side.

Figure 5:
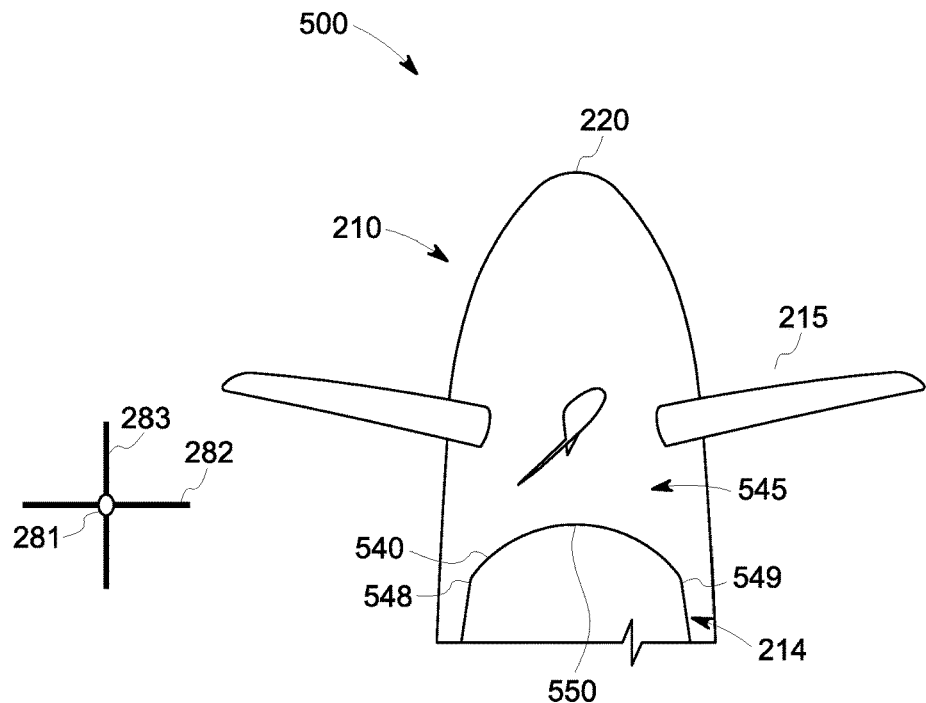
FIG. 5 is a bottom plan view of an exemplary turboprop assembly used with the aircraft in FIG. 1 showing one embodiment of a circumferentially contoured inlet.

FIG. 5 is a bottom plan view of an exemplary turboprop assembly 500 used with aircraft 10 (shown in FIG. 1) showing one embodiment of a circumferentially contoured inlet. Turboprop assembly 500 includes at least one wall 540 defining air intake port 545. Intake port 545 extends along both lateral axis 282 and streamwise axis 283. As intake port 545 extends outward from its center along lateral axis 282, intake port 545 extends backward along streamwise axis 283, such that the center of intake port 545 is closer to propellers 215 than the outer edges, such that starboard side 548 and port side 549 of intake port 545 are recessed away from propellers 215. In this embodiment, intake port 545 is curved or arcuate in shape when viewed from the below as in FIG. 5.

Figure 6:
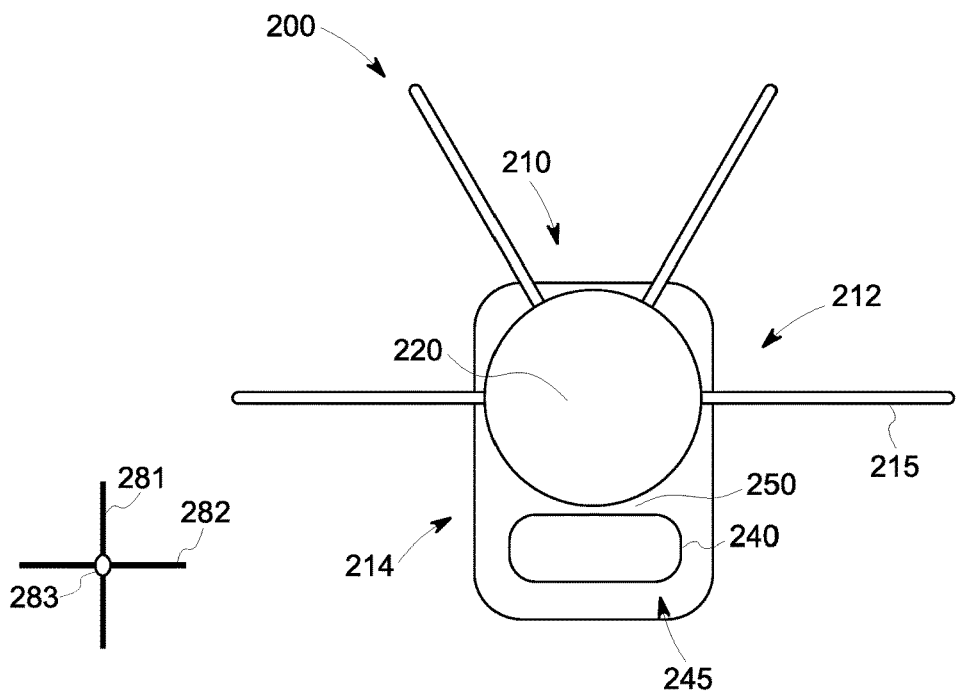
FIG. 6 is a front perspective view of the prior art turboprop assembly shown in FIG. 2.

FIG. 6 is a front perspective view of the prior art turboprop assembly 200 (shown in FIG. 2). Air intake port 245 of typical turboprop assembly 200 includes a typical, substantially oval shape.

Figure 7:
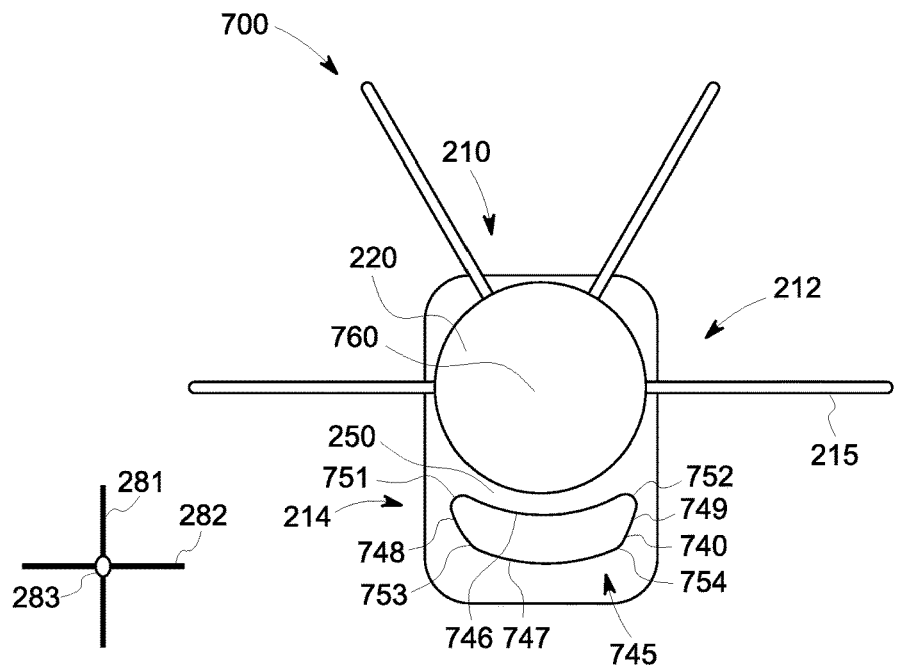
FIG. 7 is a front perspective view of an exemplary turboprop assembly used with the aircraft in FIG. 1 showing an embodiment of an inlet lip shape.

FIG. 7 is a front perspective view of an exemplary turboprop assembly 700 used with aircraft 10 (shown in FIG. 1) showing an embodiment of an inlet lip shape. FIG. 7 is a front perspective view of the turboprop assembly shown in FIG. 5 showing another embodiment of an inlet lip shape. Turboprop assembly 700 includes at least one wall 740 that defines air intake port 745, which includes upper lip 746, lower lip 747, and two side lips: a first side lip 748 and a second side lip 749. Upper lip 746 extends in a curved or arcuate manner along vertical axis 281 and lateral axis 282 from a first end 751 to a second end 752. Lower lip 747 extends similarly in a curved or arcuate manner along vertical axis 281 and lateral axis 282 from a third end 753 to a fourth end 754. First side lip 748 couples upper lip 746 to lower lip 747 between first end 751 and third end 753. Second side lip 749 couples upper lip 746 to lower lip 747 between second end 752 and fourth end 754. Upper lip 746 and lower lip 747 each have an approximately constant radius from center 760 of hub 220. Side lips 748, 749 are not semi-circular in shape and instead have a peaked tip upwards along vertical axis 281, such that first side lip 748 extends further along vertical axis 281 than lateral axis 282 between third end 753 and first end 751, and second side lip 749 extends further along vertical axis 281 than lateral axis 282 between fourth end 754 and second end 752. This peaked tip on side lips 748, 749 dampens the unsteady surface pressures on intake port 745 resulting from airflow wakes from propellers 215. Although this, and other embodiments herein, describe an upper lip, a lower lip, and two side lips, alternative embodiments include any number of lips suitable to allow the air intake port to function as described herein.

Figure 8:
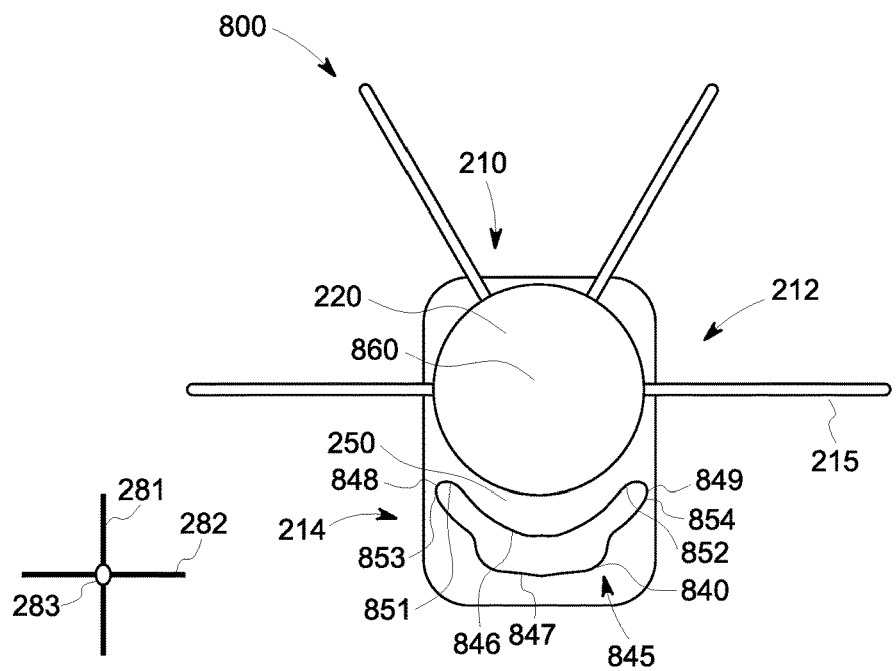
FIG. 8 is a front perspective view of an exemplary turboprop assembly used with the aircraft in FIG. 1 showing another embodiment of an inlet lip shape.

FIG. 8 is a front perspective view of an exemplary turboprop assembly 800 used with aircraft 10 (shown in FIG. 1) showing another embodiment of an inlet lip shape. Turboprop assembly 800 includes at least one wall 840 defining air intake port 845, which includes upper lip 846, lower lip 847, and two side lips: a first side lip 848 and a second side lip 849. Upper lip 846 extends in a curved or arcuate manner along vertical axis 281 and lateral axis 282 from a first end 851 to a second end 852. Lower lip 847 extends in a curved or arcuate manner along vertical axis 281 and lateral axis 282 from a third end 853 to a fourth end 854. First side lip 848 couples upper lip 846 to lower lip 847 between first end 851 and third end 853. Second side lip 849 couples upper lip 846 to lower lip 847 between second end 852 and fourth end 854. Upper lip 846 substantially follows the curvature of hub 220 between first end 851 and second end 852 and is substantially a constant radius from center 860 of hub 220. The central portion of lower lip 847 substantially follows the curvature upper lip 846, except that, as lower lip 847 extends outward in the lateral axis direction 282, the distance between upper lip 846 and lower lip 847 decreases such that upper lip 846 is closer to lower lip 847 at side lips 848, 849 than in the center. That is, lower lip 847 decreases in distance from upper lip 846 as intake port 845 extends outward along lateral axis 282.

Figure 9:
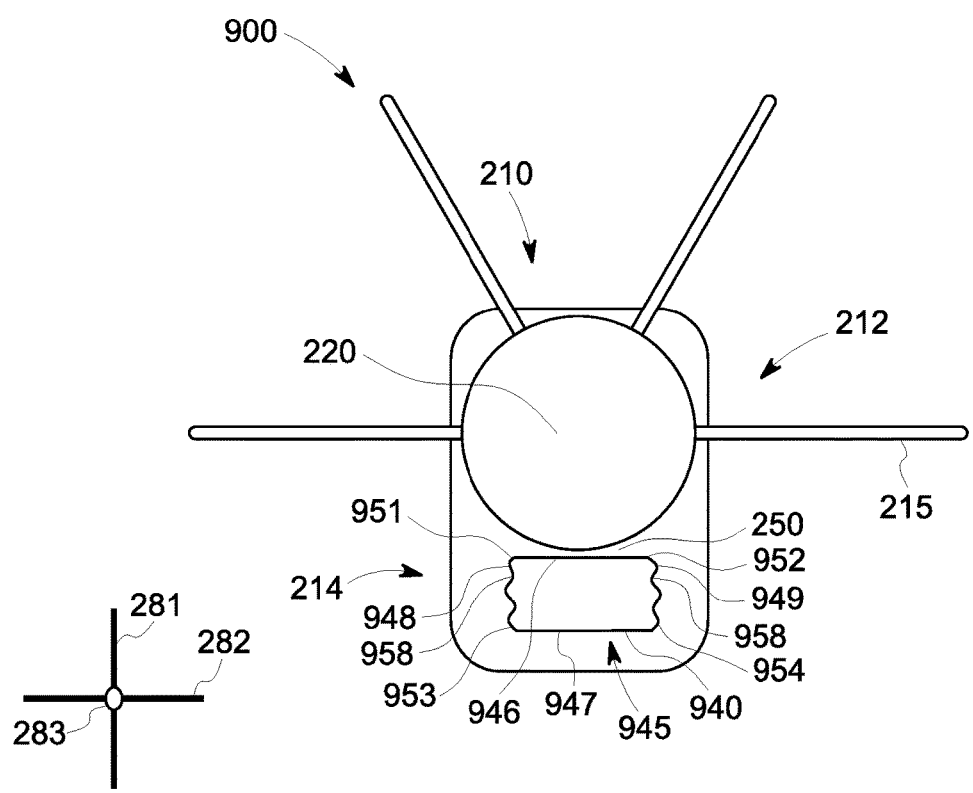
FIG. 9 is a front perspective view of an exemplary turboprop assembly used with the aircraft in FIG. 1 showing yet another embodiment of an inlet lip shape.

FIG. 9 is a front perspective view of an exemplary turboprop assembly 900 used with aircraft 10 (shown in FIG. 1) showing yet another embodiment of an inlet lip shape. Turboprop assembly 900 includes at least one wall 940 defining air intake port 945, which includes upper lip 946, lower lip 947, and two side lips: a first side lip 948 and a second side lip 949. Upper lip 946 extends between a first end 951 and a second end 952 along lateral axis 282 with substantially little curvature. Lower lip 947 extends between a third end 953 and a second end 954 along lateral axis 282 with substantially little curvature, or with a substantially similar curvature to the curvature of upper lip 946 described above. First side lips 948 and second side lip 949 each include at least one wavy portion 958 that extends outwards away from the center of air intake port 945 such that wavy portion 958 extends in a curved or arcuate manner outward along the lateral axis with at least one convex portion. The perimeter of air intake port 945 takes the shape of any of the above described lip shapes with the incorporation of wavy portion 958 at side lips 948, 949. In another embodiment, wavy portion 958 instead includes at least one concave portion and extends inward toward the center of air intake port 945. In yet another embodiment, side lips 948, 949 include a series of concave portions and convex portions. In other embodiments, wavy portions 958 are instead or additionally included on upper lip 946 or lower lip 947.

Figure 10:
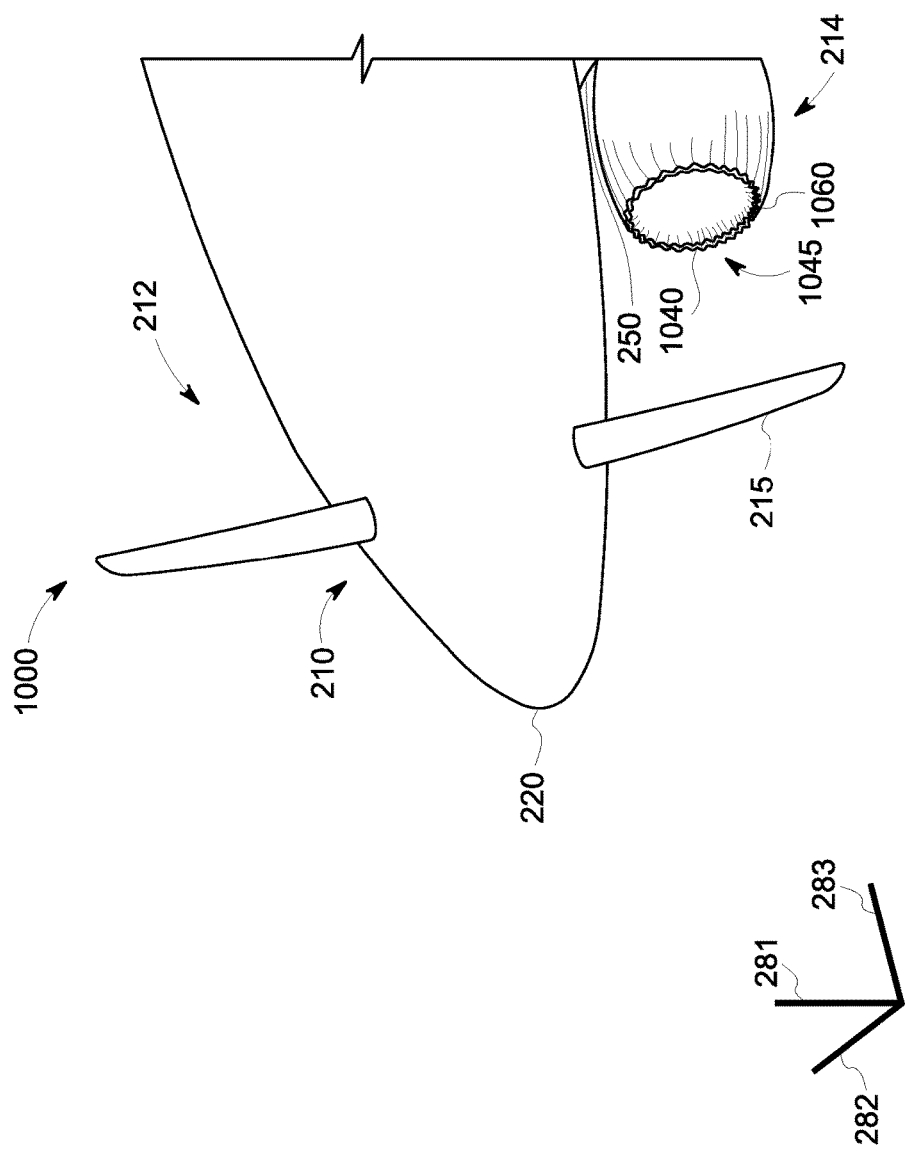
FIG. 10 is an isometric view of an exemplary turboprop assembly used with the aircraft in FIG. 1 showing one embodiment of protuberances around the perimeter of an inlet lip.

FIG. 10 is an isometric view of an exemplary turboprop assembly 1000 used with the aircraft 10 (shown in FIG. 1) showing one embodiment of protuberances around the perimeter of an inlet lip. Turboprop assembly 1000 includes at least one wall 1040 defining intake port 1045 with a plurality of protuberances 1060 around the perimeter of intake port 1045. Protuberances 1060 take any suitable form, including, but not limited to, bumps, ridges, grooves, or dimples, or any combination of these. In this embodiment, the shape of intake port 1045 is generally circular or oval-shaped. In other embodiments, the shape of intake port 1045 is any suitable shape, including the exemplary embodiments described herein. For example, an alternative embodiment (not shown) combines protuberances 1060 with the bow-tie inlet lip shape 945 of turboprop 900 (shown in FIG. 9). In this embodiment, protuberances 1060 are uniformly shaped and uniformly spaced. In other embodiments, protuberances 1060 are not uniformly shaped. In other embodiments, protuberances 1060 are not uniformly spaced, or alternatively include a portion of the inlet lip with protuberances 1060 and a portion of inlet lip without protuberances 1060.

Many of the embodiments described herein can be combined with other embodiments. Contoured inlets, described as turboprop assembly embodiments 300, 400, and 500, are combinable with each other and with various inlet shapes described as turboprop assembly embodiments 700, 800, and 900. Such embodiments are further combinable with the air inlet shape described as turboprop assembly embodiment 1000. For example, an alternative embodiment (not shown) combines embodiments 300, 500, 700, and 1000. This embodiment includes a contoured intake port similar to intake port 345 such that the lower and side lips are recessed further away from the propellers than this upper lip. This embodiment further includes an intake port shape similar to intake port 745 such that the upper lip and lower lip maintain an approximately constant radius from the center of the hub (i.e., the propeller rotation axis), but with peaked tips at the side lips. This embodiment further includes an intake port shape similar to intake port 1000 such that the intake port includes a plurality of protuberances around the perimeter of the intake port. Many other combinations are possible and any feature of one embodiment may be used with any feature of any other embodiment.

The above-described air inlet shapes overcome a number of deficiencies associated with known turboprop systems. Specifically, the unsteady aerodynamic interaction between the propeller and inlet on known turboprop assemblies leads to additional sound generation beyond the noise of the components of the turboprop assembly by themselves. While the severity of the unsteady aerodynamic interaction could be reduced by redesigning the propeller airfoil section near the hub, this may not be feasible because of system considerations such as, for example, the spacing between the propeller hub and the intake port, or the integrity of the propeller root attachment. But, by reconfiguring the shape of the inlet, the wakes in the airflow produced by the propellers are less impacted by the unsteady aerodynamic interaction that occurs as the propellers pass in front of the inlet, thus leading to lower levels of wake distortions to lessen the unsteady response of these wakes impinging on the inlet. The reconfiguration of the inlet shape reduces the aerodynamically-generated sounds and also increases the propeller efficiency, which reduces overall aircraft fuel burn. The inlet shapes described herein are configured specifically for air inlets and are reshaped to reduce the noise generated by the interaction of airflow between the propellers and the air inlet.

An exemplary technical effect of the methods, systems, and apparatus described herein includes at least one of: (a) decreasing aerodynamically-generated sounds; (b) improving propeller efficiency by redirecting the airflow behind the propellers as the airflow hits the air intake port; and (c) decreasing overall aircraft fuel burn as a byproduct of improved propeller efficiency.

Exemplary embodiments of various shapes of air intake ports are described above in detail. The air intake shapes and methods of manufacturing or operating such a system and device are not limited to the specific embodiments described herein, but rather, components of systems and/or steps of the methods may be utilized independently and separately from other components and/or steps described herein. For example, the systems, apparatus, and methods may also be used in combination with each other and other air intake ports, and are not limited to practice with only the devices, systems and methods as described herein. Rather, the exemplary embodiments can be implemented and utilized in connection with other air intake ports.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A turboprop assembly comprising:
   a main nacelle body;
   a nacelle extension coupled to said main nacelle body, said nacelle extension defining three orthogonal axes and comprising at least one wall defining an air intake port extending along the three orthogonal axes, the air intake port having an upper lip, a lower lip, a first side lip and a second side lip, the upper lip extending from a first end to a second end; the lower lip extending from a third end to a fourth end, the first side lip extending from the first end to the third end and coupling the upper lip to the lower lip and the second side lip extending from the second end to the fourth end and coupling the upper lip to the lower lip; and
   a hub including a plurality of propellers rotatable about the hub, the main nacelle body coupled to the hub, and wherein the lower lip, the first side lip and the second side lip are recessed further away from the plurality propellers than the upper lip.

2. The turboprop assembly in accordance with claim 1, wherein said upper lip extends arcuately along the vertical axis and the lateral axis from said first end to said second end, said lower lip extends arcuately along the vertical axis and the lateral axis from said third end to said fourth end, and said first side lip and said second side lip extends further along the vertical axis than in the lateral axis.

3. The turboprop assembly in accordance with claim 1, wherein said lower lip decreases in distance from said upper lip as said air intake port extends toward said first side lip and said second side lip.

4. The turboprop assembly in accordance with claim 1, wherein said first side lip includes at least one wavy portion thereon and said second side lip includes at least one wavy portion thereon, said at least one wavy portion defined by at least one concave portion or at least one convex portion.

5. The turboprop assembly in accordance with claim 1, wherein said air intake port includes a plurality of protuberances along its perimeter.

6. A turboprop assembly comprising:
   a main nacelle body; and
   a nacelle extension coupled to said main nacelle body, said nacelle extension defining three orthogonal axes and comprising at least one wall defining an air intake port, the air intake port extending along the three orthogonal axes, and
   a hub including a plurality of propellers rotatable about the hub, the main nacelle body coupled to the hub,
   said air intake port comprising:
      an upper lip extending from a first end to a second end;
      a lower lip extending from a third end to a fourth end;
      a first side lip extending from said first end to said third end and coupling said upper lip to said lower lip;
      a second side lip extending from said second end to said fourth end and coupling said upper lip to said lower lip, and
      wherein the upper lip is disposed a first distance from the plurality of propellers along a streamwise axis and the lower lip, the first side lip and the second side lip are disposed a second distance from the plurality of propellers along a streamwise axis, wherein the first distance is less than the second distance.

7. The turboprop assembly in accordance with claim 6, wherein said air intake port further comprises a plurality of protuberances along its perimeter.

8. The turboprop assembly in accordance with claim 7, wherein said upper lip extends arcuately along the vertical axis and the lateral axis from said first end to said second end, said lower lip extends arcuately along the vertical axis and the lateral axis from said third end to said fourth end, and said first side lip and said second side lip extends further along the vertical axis than in the lateral axis.

9. The turboprop assembly in accordance with claim 7, wherein said lower lip decreases in distance from said upper lip as said air intake port extends toward said first side lip and said second side lip.

10. The turboprop assembly in accordance with claim 7, wherein said first side lip includes at least one wavy portion thereon and said second side lip includes at least one wavy portion thereon, said at least one wavy portion defined by at least one concave portion or at least one convex portion.

11. An aircraft comprising:
    a fuselage;
    a pair of wings;
    at least one turboprop assembly coupled to either each of said pair of wings or to said fuselage, said turboprop assembly comprising:
       a nacelle comprising:
          a main nacelle body; and
          a nacelle extension coupled to said main nacelle body, said nacelle extension defining three orthogonal axes and comprising at least one wall defining an air intake port having a perimeter that is out-of-plane, the air intake port extending along three orthogonal axes, wherein the three orthogonal axes include a lateral axis, a streamwise axis, and a vertical axis, the air intake port having an upper lip, a lower lip, a first side lip and a second side lip, the upper lip extending from a first end to a second end; the lower lip extending from a third end to a fourth end, the first side lip extending from the first end to the third end and coupling the upper lip to the lower lip and the second side lip extending from the second end to the fourth end and coupling the upper lip to the lower lip; and a hub including a plurality of propellers rotatable about the hub, the main nacelle body coupled to the hub, and wherein the lower lip, the first side lip and the second side lip are recessed further away from the plurality propellers than the upper lip.

* * * * *